United States Patent
McCracken, Jr.

(10) Patent No.: US 12,309,581 B2
(45) Date of Patent: May 20, 2025

(54) MULTI-LEVEL AUTHENTICATION SECURITY SERVICE

(71) Applicant: T-Mobile Innovations LLC, Overland Park, KS (US)

(72) Inventor: Billy Gene McCracken, Jr., Lenexa, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 601 days.

(21) Appl. No.: 17/545,806

(22) Filed: Dec. 8, 2021

(65) Prior Publication Data

US 2023/0179998 A1    Jun. 8, 2023

(51) Int. Cl.
  *H04W 12/06* (2021.01)
  *H04L 9/40* (2022.01)
  *H04W 12/61* (2021.01)
  *H04W 12/72* (2021.01)

(52) U.S. Cl.
  CPC ........... *H04W 12/06* (2013.01); *H04L 63/083* (2013.01); *H04L 63/0853* (2013.01); *H04L 63/0861* (2013.01); *H04W 12/61* (2021.01); *H04W 12/72* (2021.01)

(58) Field of Classification Search
  CPC ..... H04W 12/06; H04W 12/72; H04W 12/61; H04L 63/083; H04L 63/0853; H04L 63/0861
  See application file for complete search history.

(56) References Cited

U.S. PATENT DOCUMENTS

| | | | |
|---|---|---|---|
| 9,148,776 B1* | 9/2015 | Schroeder | H04L 61/4588 |
| 9,717,003 B2* | 7/2017 | Lee | H04W 12/06 |
| 9,842,356 B2* | 12/2017 | McCabe | G06Q 30/06 |
| 10,091,168 B2* | 10/2018 | Hodroj | H04W 12/086 |
| 10,194,320 B1* | 1/2019 | Egner | H04W 12/61 |
| 11,070,980 B1* | 7/2021 | Hohler | H04L 63/0807 |
| 2013/0024921 A1* | 1/2013 | Gupta | H04L 41/0806 726/6 |
| 2014/0101453 A1* | 4/2014 | Senthurpandi | G06F 21/32 713/172 |

(Continued)

*Primary Examiner* — Philip J Chea
*Assistant Examiner* — Ghizlane Maazouz

(57) ABSTRACT

A method for authenticating a user by a wireless service provider security service. The method comprises receiving a multi-level authentication request from a security client, performing first-layer authentication including determining whether values of user identifier (ID) and password from the security client match user ID and password values stored by the network application and associated with the user's network subscriber identifier, performing second-layer authentication including determining whether a response code value from the security client matches a generated code value sent to the security client, performing third-layer authentication including determining whether a radio access network (RAN) attach credential from the security client matches a RAN attach credential stored by the wireless service provider and associated with the network subscriber identifier, and sending the security client an authentication response that confirms authentication of the user based on successful authentication at all three layers, and denies authentication of the user otherwise.

20 Claims, 10 Drawing Sheets

(56) References Cited

U.S. PATENT DOCUMENTS

| | | | |
|---|---|---|---|
| 2016/0037340 A1* | 2/2016 | Rayment | H04W 76/12 |
| | | | 370/338 |
| 2016/0164883 A1* | 6/2016 | Li | H04W 8/205 |
| | | | 726/7 |
| 2017/0150351 A1* | 5/2017 | Narasimha | H04W 60/04 |
| 2017/0237734 A1* | 8/2017 | Hallenborg | H04W 12/069 |
| | | | 726/7 |
| 2017/0280319 A1* | 9/2017 | Breuer | H04W 8/205 |
| 2017/0339626 A1* | 11/2017 | Mustajärvi | H04W 12/068 |
| 2018/0351950 A1* | 12/2018 | Bao | H04L 63/0884 |
| 2020/0137679 A1* | 4/2020 | Poovappa | H04M 7/006 |
| 2020/0169568 A1* | 5/2020 | Kurian | H04W 12/06 |
| 2021/0352577 A1* | 11/2021 | Meredith | H04W 8/20 |
| 2022/0197988 A1* | 6/2022 | Kairali | G06N 3/047 |
| 2023/0070215 A1* | 3/2023 | Richter | G06Q 20/3223 |
| 2023/0091318 A1* | 3/2023 | Lindemann | H04L 63/20 |
| | | | 726/4 |

\* cited by examiner

MULTI-LEVEL AUTHENTICATION SECURITY SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network authentication verifies the user's identification to a network service to which the user tries to gain access. A user identifier (ID) and password provide one type of verification of a user. Two-factor authentication may be used to provide further verification that the user is who they claim to be. In some such systems, the second factor may be a code that is sent to the user's cellphone via text message, direct data message (server to client app), or via email. In other such systems, the second factor may be a code obtained from a hardware security key (or 'dongle'). Alternatively, a biometric scan of a retina, face recognition, DNA, voice print, fingerprint, or other physical characteristic may be used to provide verification of the user's identity.

SUMMARY

In an embodiment, a method for authenticating a user by a security service executing on a network server operated by a wireless communication service provider is disclosed. The method comprises receiving by the security service from a security client executing on a subscriber device a multi-level authentication request for access to a network application, performing by the security service a first-layer authentication process, comprising determining whether response values of user identifier (ID) and password received from the security client match stored values of user ID and password stored by the network application and associated with a network subscriber identifier associated with the user, based on successful first-layer authentication of the user, performing by the security service a second-layer authentication process, comprising determining whether a response code value received from the security client matches a generated code value sent by the security service to the security client, based on successful second-layer authentication of the user, performing by the security service a third-layer authentication process, comprising determining whether a radio access network (RAN) attach credential received from the security client matches a RAN attach credential stored by the wireless communication service provider and associated with the network subscriber identifier, and sending by the security service to the security client an authentication response that confirms authentication of the user based on successful first-layer, second-layer, and third-layer authentication of the user, and denies authentication of the user otherwise.

In another embodiment, a method for authenticating a user by a security client executing on a subscriber device is disclosed. The method comprises sending by the security client executing on the subscriber device to a security service executing on a network server operated by a wireless communication service provider a multi-level authentication request for access to a network application, sending by the security client to the security service values of user identifier (ID) and password, sending by the security client to the security service a code value received from the security service, sending by the security client to the security service a RAN attach credential stored in the subscriber device, and receiving by the security client from the security service an authentication response confirming or denying authentication of the user.

In yet another embodiment, a method for authenticating a user by a security service executing on a network server of a wireless communication service provider is disclosed. The method comprises receiving by the security service executing on the network server a multi-level authentication request from a network application, the multi-level authentication request comprising an authentication layers specification specifying one or more layers of authentication for the security service to perform, a network subscriber identifier, and an identifier of a subscriber device, if specified by the authentication layers specification, performing by the security service a first-layer authentication process, comprising determining whether response values of user identifier (ID) and password received from a security client of the subscriber device match stored values of user ID and password stored by the network application and associated with the network subscriber identifier, if specified by the authentication layers specification, performing by the security service a second-layer authentication process, comprising determining whether a response code value received from the security client matches a generated code value sent by the security service to the security client, if specified by the authentication layers specification, performing by the security service a third-layer authentication process, comprising determining whether a RAN attach credential received from the security client matches a RAN attach credential stored by the wireless communication service provider and associated with the network subscriber identifier, if specified by the authentication layers specification, performing by the security service a fourth-layer authentication process, comprising determining whether an identity of a user of the security client determined by a biometric authentication process matches the network subscriber identifier, and sending by the security service to the network application an authentication response that confirms or denies authentication of the user based on results of the one or more layers of authentication specified by the authentication layers specification and performed by the security service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
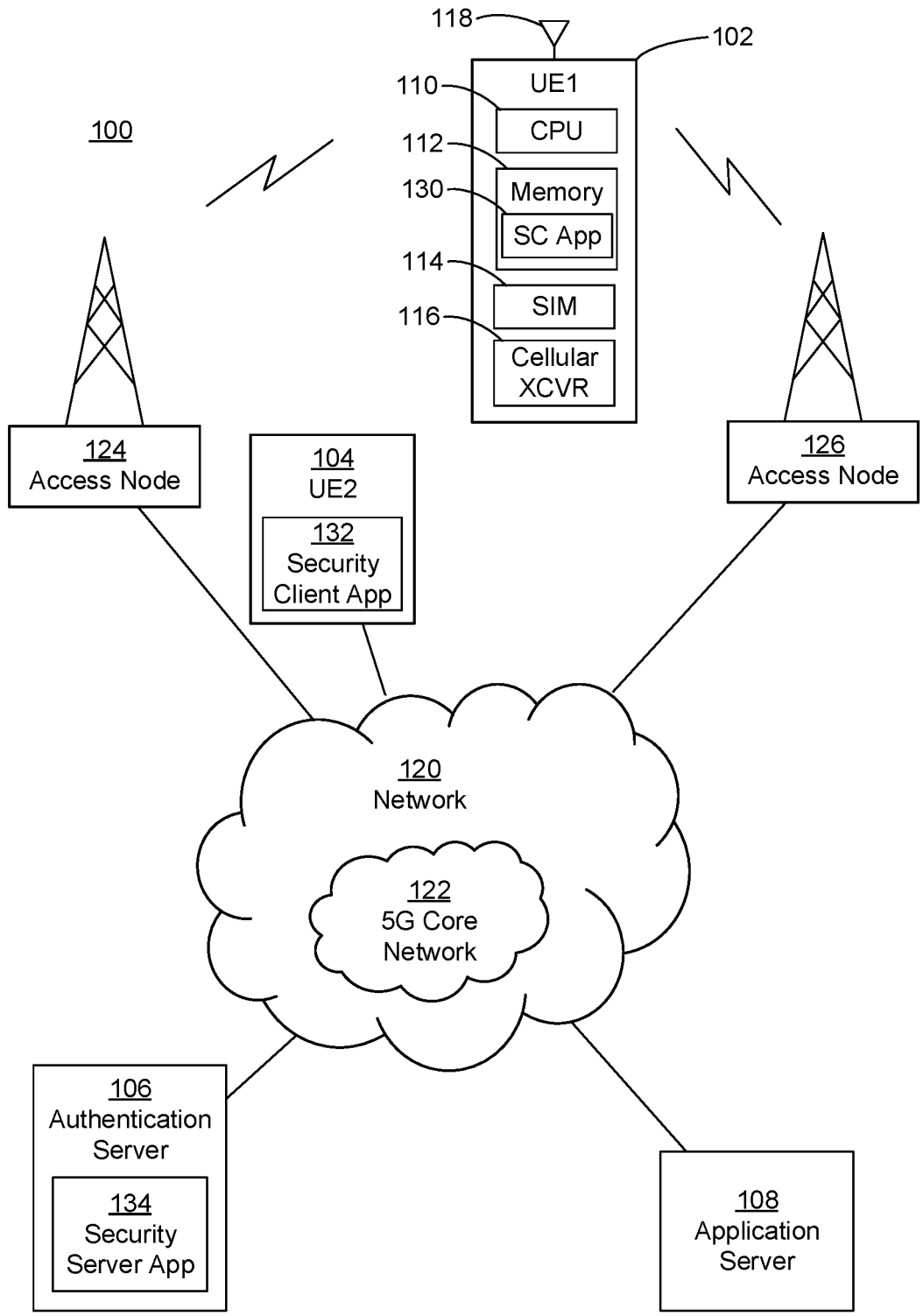
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In embodiments of the disclosure, more than the two-factor authentication often provided for authentication of users interacting with web applications may be provided. To authenticate that the user of a subscriber device is the network subscriber they purport to be, some embodiments may provide three-factor authentication or four-factor authentication. Embodiments may be structured as a security service orchestrated by a server application executing in a wireless service provider network that interworks with a security client on a subscriber device (e.g., a mobile phone, a tablet computer, a wearable computer, etc.).

Authentication of subscribers and subscriber devices in a network is a technical problem arising from the wired and wireless communications infrastructure of the network, the intermittent connectivity of the subscriber devices, and the devices' shifting connectivity through various portions of the network. Authentication may currently be performed through determining one or more of something the subscriber knows (e.g., a password), something the subscriber has (e.g., a device to receive a text message), or an aspect of the subscriber's person (e.g., fingerprint). However, each of these authentication steps may be spoofed by trickery, interception, or impersonation. The multi-level authentication security service of the disclosure provides a technical solution to this problem by adding an authentication test that is based on network connection information known only to the network and the subscriber device, stored in highly secure hardware, is communicated using highly secure communication channels, and may change frequently, greatly reducing the ability of a bad actor to obtain the network connection information to use in spoofing the authentication process.

A first authentication factor may be provided by the user inputting a user identity and a password. A second authentication factor may be sending a code via a text message or other channel to the user's subscriber device, and asking the user to input the code for validation. As such, in conventional two-factor authentication, the user must (1) know something and must (2) have something (e.g., the device on which to receive the code message). However, it is possible for a bad actor to spoof (or impersonate) a subscriber device.

A third factor of authentication can be provided by prompting the subscriber device—for example a security client installed on the device—to provide a network registration artifact that is associated with the device having attached to a radio access network (RAN) of the wireless service provider (a RAN attach credential). This information is only available within the actual user's device and cannot be spoofed. The returned registration artifact is compared to the actual registration artifact stored by the wireless service provider. In an embodiment, this registration artifact changes often, e.g., as the subscriber device attaches to different cell sites, thereby reducing a risk of replay identity theft. Such a registration artifact is available within the device even if a user is communicating over the internet via WiFi and is NOT actively engaged in wireless communication session (such as a voice call or a data session). In an example, the user's device is typically still attached to the RAN even when in an idle mode. This registration artifact is essentially un-hackable and hence highly secure.

A fourth authentication factor could be provided by biometric input. The security client on the device can be challenged to validate the user's biometric information on-device (e.g., in some embodiments after the third factor authentication, so it is clear the user's device is being operated by the user and not by some other person).

One type of registration artifact is a RAN attach credential that is generated only by a secure module in the device such as a subscriber identification (or identity) module (SIM), an embedded SIM (eSIM), a universal integrated circuit card (UICC), or an embedded UICC (eUICC) of the subscriber device (referred to collectively herein as the SIM of the device). The RAN attach credential is generated solely by the SIM in a secure way that is not visible to other processes on the device and using secure network credentials stored only within the SIM. The RAN attach credential is stored in the device only within the SIM and passes only transiently through other parts of the device (e.g., the radio modem) but is not stored there. Upon generation, the RAN attach credential may be sent via a secure channel to the wireless network provider.

In some embodiments, the RAN attach credential is generated by the SIM upon a first attachment of the device to the wireless network. In other embodiments, the RAN attach credential is generated by the SIM each time the device is handed off from one cell site or channel to another cell site or channel of the wireless network, i.e., when an active call or data session of the device is transferred between cell sites or channels of the wireless network.

The RAN attach credential may be generated from static information stored in the SIM and a randomization or encryption factor. Such a randomization factor may be a salt that changes for each generation of a RAN attach credential, where the salts rotate in a pattern known to both the device and the wireless network. In some such embodiments, the static information is an International Mobile Station Equipment Identity (IMEI), an International Mobile Subscriber Identity (IMSI), an Integrated Circuit Card Identifier (IC-CID), or other secure hardware- or firmware-level identifier that is difficult to modify.

In some embodiments, the RAN attach credential is generated in an authentication exchange between the subscriber device and the wireless network upon connection of the subscriber device to the wireless network or handover of the subscriber device within the wireless network. In such an authentication exchange, the subscriber device sends an authentication request to the wireless network. The wireless network generates an authentication token based upon a random number, the authentication request, and shared information known only to the wireless network and the secure module of the subscriber device. The wireless network sends the authentication token and the random number to the subscriber device via a secure channel. The secure module of the subscriber device calculates a value based on the authentication token, the shared information, and the random number and sends the value to the wireless network via the secure channel. If the value matches a value calculated by the wireless network from the authentication token, the shared information, and the random number. If the two values match the subscriber device is considered by the wireless device to be authenticated. The authentication request may include the IMSI, IMEI, or ICCID stored in the secure module of the subscriber device. The RAN attach credential may comprise one or both of the authentication token and the matching values calculated by the secure module and the wireless network. In other embodiments, the RAN attach credential may generated based on an exchange of other confidential information between the subscriber device and the wireless communication service provider during authentication of the subscriber device into the RAN.

Security functionality as described herein may be provided by a security server application (or security service) interworking with a security client on a subscriber device. A third party application (e.g., a banking application) may be executing on a network server and need to authenticate a user (e.g., a bank patron) who is communicating with the application via the internet. The banking application may send a multi-level authentication request from its network server to the authentication service. Such an arrangement may be referred to as authentication as a service. In another example, the user is using a banking app on their subscriber device and, when authentication is required, it is the subscriber device that sends a multi-level authentication request to the authentication service. In such an arrangement, authentication according to the disclosure may be provided in a client-server arrangement. Thus, the authentication service may be requested from a network server or from a subscriber device.

The requested authentication from the security service may specify a selectable number of the multiple layers of security. The security service conducts the desired level of authentication with the device and returns the result to the requesting third party application. For example, when a user is first attempting to connect to an application, the application may specify all levels of authentication. If the user remains actively connected to the application for an extended period of time, the application may occasionally request that the security service re-authenticate the user with fewer than all the layers, for example with only the biometric layer or only the registration artifact layer. In some embodiments, such re-authentication may be performed without user interaction.

In another example, the levels of authentication provided according to the disclosure may be utilized at different stages of a user session. When initially accessing an e-commerce site, the site may specify only the first level of authentication (user ID and password). When the user attempts to leave a review of a product or service, the site may specify only the second level of authentication (generated code value). When the user attempts to make a purchase for less than a threshold amount, the site may specify the third level of authentication (RAN attach credential). And when the user attempts to make a purchase for more than the threshold amount, the site may specify the fourth level of authentication (biometric scan).

In some embodiments, at completion of the authentication process, the security service may create an multi-level authentication token that is associated with the subscriber RAN attach credential and an identifier of the network subscriber who is associated with the device. By sending the token via a secure channel for secure storage on the subscriber device, when a subsequent authentication is requested for the same network subscriber on the same subscriber device, the token may be used by the security service and the security client to re-authenticate the user with fewer steps.

In an embodiment, the multi-level authentication token is encrypted by the sender, sent in encrypted form, and decrypted by the receiver. The encryption may use a different salt on each use, rotating the salts in a pattern known to both the sender and the receiver.

Such a multi-level authentication token might include a time-stamp so that the token's validity is time-limited and the security service performs a full re-authentication of the user after a pre-determined period of time has passed. The multi-level authentication token may also be associated with a specification of authentication layers that were used in its creation, and the security service may accept the token for a subsequent multi-level authentication request only if the request specifies the same authentication layers.

Turning now to FIG. 1, a system 100 is described. In an embodiment, the system 100 comprises User Equipment (UE) 102 and 104, an authentication server 106, and an application server 108, communicating wired or wirelessly via a network 120. The UE 102 may be a handheld device, such as a smart phone or tablet and the UE 104 may be a laptop computer, both communicating wirelessly with the network 120. The network 120 may be one or more public networks, one or more private networks, or a combination thereof. The network 120 may comprise or be coupled to a 5G core network 122 or, in other embodiments, a 4G or 4G LTE network.

The UE 102 comprises a processor 110, a memory 112, a SIM 114, a cellular radio transceiver 116, and an antenna 118. A portion of the memory 112 may be a non-transitory memory and a portion of the memory 112 may be a transitory memory. When properly activated and provisioned, the UE 102 may be able to establish a wireless communication link to a radio access network (RAN), for example to an access node 124. The access node 124 may also be referred to as a cell site or cell tower in some contexts. The access node 124 may provide the UE 102 a communication link to the network 120. The UE 102 may communicate via the access node 124 and via the network 120 to the authentication server 106 and/or the application server 108.

The network 120 may include elements from more than one wired or wireless service provider. For example, the UE 102 may be coupled to the network 120 via a first service provider, while the application server 108 may be coupled via a second service provider. Any of the elements of system 100 may be coupled to other elements via the 5G core network 122. Where the network 120 comprises elements from multiple service providers, the network 120 may include a plurality of 5G core networks 122, each supported by a different service provider and coupled to each other directly or via wired or wireless connections through non-5G elements of the network 120.

The UE 102 may be coupled wirelessly to the network 120. Based on proximity, radio channel quality, or other conditions, the UE 102 may be wirelessly coupled to the network 120 via one or the other of the access nodes 124 and 126. When the UE 102 is coupled to the network 120 via the access node 124 and conditions change, the network 120 may transfer (or hand off) an active call or data session of the UE 102 from the access node 124 to the access node 126.

The non-transitory memory 112 of the UE 102 includes a security client application (app) 130. Similarly, the UE 104 includes a security client app 132 in non-transitory memory. The authentication server 106 includes a security server application 134. The security client apps 130 and 132 may be referred to herein as security clients and the security server app 134 may be referred to herein as a security service. The security client apps 130 and 132 and the security server app 134 are described in greater detail below.

A user on UE 102 attempts to log in to an application on the application server 108. In various examples, the application may be a banking app, an e-commerce app, an e-contract app, or a medical records app. In response, the application sends a multi-level authentication request to the security server app 134 executing on the authentication server 106. The multi-level authentication request includes a network subscriber identifier of the user on UE 102, and an identifier of the UE 102. The multi-level authentication request further includes an authentication layers specification that specifies one or more layers of authentication for the security service to perform.

If specified by the authentication layers specification, the security server app 134 initiates a first-layer authentication process by sending to the security client app 130 of the UE 102 a first-layer multi-level authentication request. In response, the security server app 134 receives from the security client app 130 a first-layer authentication response that includes a user ID and password obtained by the security client from the user. The security server app 134 then determines whether the user ID and password received in the first-layer authentication response match values of a user ID and password stored by application on the application server 108 and associated with the network subscriber identifier.

If also specified by the authentication layers specification, the security server app 134 initiates a second-layer authentication process by sending to the UE 102 a generated code value. The code value may be sent by an SMS or other messaging service of the network 120. Alternatively, the code value may be sent to an email address that is associated with the network subscriber identifier. In either case, the security server app 134 next sends to the security client app 130 a second-layer multi-level authentication request. In response, the security client app 130 sends to the security server app 134 a second-layer authentication response that includes a response code value. The security server app 134 then determines whether the response code value matches the generated code value.

Additionally, if specified by the authentication layers specification, the security server app 134 initiates a third-layer authentication process by sending to the security client app 130 a third-layer multi-level authentication request. In response, the security client app 130 sends to the security service a RAN attach credential that is stored in a SIM of the UE 102.

The wireless communication service provider will have stored the RAN attach credential when it was created and associated it with the network subscriber identifier. The RAN attach credential may be obtained from the security client app 130 even if the UE 102 is currently connected to the network 120 by WiFi or another communication channel other than a cellular connection. The security server app 134 then determines whether the RAN attach credential received from the security client app 130 matches the RAN attach credential associated with the network subscriber identifier that was previously stored by the wireless communication service provider.

Further, if specified by the authentication layers specification, the security server app 134 initiates a fourth-layer authentication process by sending to the security client app 130 a biometric multi-level authentication request specifying the network subscriber identifier. In response, the security client app 130 causes a secure biometric function of the UE 102 to perform a biometric scan, compares a result with a previously stored biometric scan result, and generates pass/fail information based on a result of the comparison. The security client app 130 then sends to the security server app 134 a biometric authentication response comprising the pass/fail information. In an embodiment, a biometric scan may be scan of a retina (e.g., eye scan), a scan of a face, a scan of DNA, a scan of a voice print, or a scan of a fingerprint.

After performing the authentication processes specified by the authentication layers specification, the security server app 134 sends to the application executing on the application server 108 an authentication response comprising authentication result information that is based on results of the one or more specified layers of authentication specified performed by the security server app 134. As described above, an authentication process according to the disclosure is provided as a service by the authentication server 106 to the application executing on the application server 108. In other embodiments the authentication process is provided in a client-server model, where the initial multi-level authentication request is sent to the security server app 134 by a network application client executing on the UE 102 via the security client app 130 and the authentication response is sent by the security server app 134 to the network application client via the security client app 130. In still other embodiments, an application (e.g., a browser) executing on the UE 102 may communicate with the application executing on the application server 108, which then sends the initial multi-level authentication request to the security server app 134 and receives the resulting authentication response.

In an example where a bad actor uses the UE 104 to attempt to access data or services by pretending to be the UE 102 and/or its associated network subscriber, the second-layer authentication process may fail when the generated code value is sent to the subscriber device associated with the purported network subscriber, the UE 102. In such a case, the user of the UE 104 will not receive the code value and will not be able to complete the second-layer authentication process successfully. Similarly, the third-layer authentication process will fail when the security service obtains from the UE 104 a RAN attach credential that does not match the stored RAN attach credential of the UE 102 that is associated with the purported network subscriber identifier. Likewise, the fourth-layer authentication process will fail when the security service obtains from the UE 104 a biometric authentication response that is associated with a person other than the purported network subscriber identifier.

As described above, in some embodiments, where authentication of the user has been confirmed, the security server app 134 performs an additional step of sending to the security client app 130 an authentication response that includes a multi-level authentication token generated by the security server app 134. The security server app 134 further associates the multi-level authentication token with the RAN attach credential and the network subscriber identifier and stores the multi-level authentication token for future use. The multi-level authentication token may be used by the security server app 134 and the security client app 130 to re-authenticate the user of the UE 102 with fewer steps.

While the authentication server 106 and the application server 108 are shown in FIG. 1 as single network elements, it will be understood that any or all of their functions may be implemented by computer systems and may be performed by a cluster of network-connected devices or provided in a decentralized manner by a network of geographically separated network elements.

Figure 2:
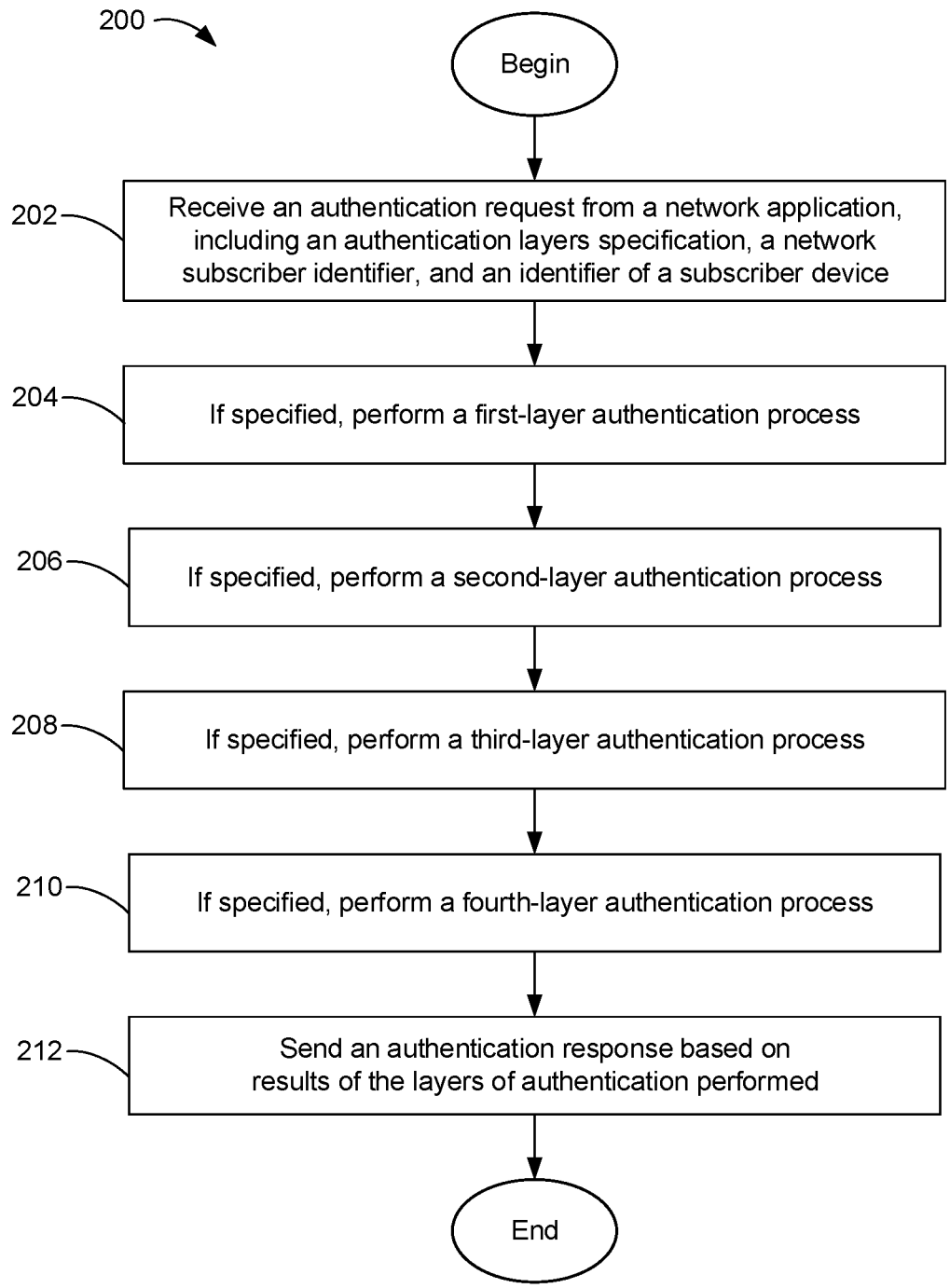
FIG. 2 is a flow chart of a method according to an embodiment of the disclosure.

FIG. 2 is a flow chart of a method 200 according to an embodiment of the disclosure. In an embodiment, the method 200 is a method of authenticating a network subscriber by the security server app 134 (also referred to as a security service) executing on a network server 106 of a wireless communication service provider. At step 202, the security server app 134 receives a multi-level authentication request from a network application. The multi-level authentication request includes (i) an authentication layers specification that specifies one or more layers of authentication for the security server app 134 to perform, (ii) a network subscriber identifier, and (iii) an identifier of the UE 102.

At step 204, if specified by the authentication layers specification, the security server app 134 performs a first-layer authentication process that includes determining whether response values of user ID and password that are received from the security client app 130 (also referred to as a security client) match stored values of user ID and password that are stored by the network application, where the stored values of user ID and password are associated with the network subscriber identifier. In some embodiments, the security server app 134 may send the security client app 130 a first-layer multi-level authentication request and, in response, receive from the security client app 130 a first-layer authentication response that includes the response values of user ID and password.

At step 206, if specified by the authentication layers specification, the security server app 134 performs a second-layer authentication process that includes determining whether a response code value received from the security client app 130 matches a generated code value sent by the security server app 134 to the UE 102. In various embodiments, the security server app 134 may send the generated code value to the UE 102 by a network message service (e.g., Short Message Service (SMS)) or via email to an email address that is associated with the network subscriber identifier. The security server app 134 may then send the security client app 130 a second-layer multi-level authentication request and, in response, receive from the security client app 130 a second-layer authentication response that includes the response code value.

At step 208, if specified by the authentication layers specification, the security server app 134 performs a third-layer authentication process that includes determining whether a RAN attach credential received from the security client app 130 matches a RAN attach credential stored by the wireless communication service provider, where the stored RAN attach credential is associated with the network subscriber identifier. In some embodiments, the security server app 134 may send to the security client app 130 a third-layer multi-level authentication request and, in response, receive from the security client app 130 a third-layer authentication response that includes the RAN attach credential stored in the UE 102. In some embodiments, the RAN attach credential is generated based on an exchange of confidential information between the subscriber device and the wireless communication service provider during authentication of the subscriber device into the RAN.

As described above, the RAN attach credential is an identifier that is generated as part of a transaction with a RAN of the wireless network, is stored in the SIM of the UE 102, and is available to the security client app 130 only via low-level device functions and, therefore, is difficult or impossible for a bad actor to intercept or replace for the purpose of defeating user authentication. The RAN attach credential is available to the UE 102 and the wireless communication service provider even when the UE 102 is not currently coupled by a RAN to the network 120 (e.g., when the UE 102 is in 'airplane mode' and coupled via WiFi and the Internet to the authentication server 106 and the application server 108).

At step 210, if specified by the authentication layers specification, the security server app 134 performs a fourth-layer authentication process that includes determining whether an identity of a user of the UE 102, as determined by a biometric authentication process, matches the network subscriber identifier. In some embodiments, the security server app 134 may send to the security client app 130 a biometric multi-level authentication request and, in response, receive from the security client app 130 a biometric authentication response that identifies the user of the security client.

At step 212, the security server app 134 sends to the network application an authentication response that confirms or denies authentication of the user. The confirmation or denial is based on results of the one or more layers of authentication that were specified by the authentication layers specification of the multi-level authentication request from a network application and were performed by the security server app 134.

In some embodiments, where authentication of the user has been confirmed by performance of the method 200, the security server app 134 performs an additional step of sending to the security client app 130 an authentication response that includes a multi-level authentication token generated by the security server app 134. The security server app 134 further associates the multi-level authentication token with the RAN attach credential and the network subscriber identifier and stores the multi-level authentication token for future use.

If the security server app 134 subsequently receives a second multi-level authentication request from the network application, where the second multi-level authentication request includes the same RAN attach credential and network subscriber identifier, the security server app 134 recognizes that a stored multi-level authentication token is associated with the RAN attach credential and the network subscriber identifier. In response, instead of re-performing the authentication processes of the method 200, the security server app 134 may perform a token authentication process, where the security server app 134 sends to the security client app 130 a token authentication request and, in response, receives a token authentication response from the security client app 130, where the token authentication response includes a multi-level authentication token and a RAN attach credential. The security server app 134 then determines whether the received multi-level authentication token matches the stored multi-level authentication token and the received RAN attach credential matches the RAN attach credential that is associated with the stored multi-level authentication token. The security server app 134 then sends to the network application an authentication response that includes authentication result information based on a result of determining whether the received multi-level authentication token matches the stored multi-level authentication token and the received RAN attach credential matches the RAN attach credential that is associated with the stored multi-level authentication token.

In some such embodiments, the multi-level authentication token includes a time-stamp reflecting the time and/or date of its creation. When the security server app 134 receives the second multi-level authentication request from the network application, the security server app 134 may compare the time-stamp of either the stored multi-level authentication token or the received multi-level authentication token to a current time to determine whether the multi-level authentication token has exceeded a predetermined 'age,' resulting in the token authentication process no longer being accepted in place of the authentication processes of the method 200. In such situations, the security server app 134 re-performs the authentication processes of the method 200.

In other such embodiments, the second multi-level authentication request from the network application includes a second authentication layers specification. If the second authentication layers specification does not match the authentication layers specification in the multi-level authentication request that led to the creation of the multi-level authentication token, then the security server app 134 performs the authentication processes of the method 200, rather than the token authentication process. That is, the token authentication process is performed only if the second authentication layers specification matches the first authentication layers specification.

Figure 3:
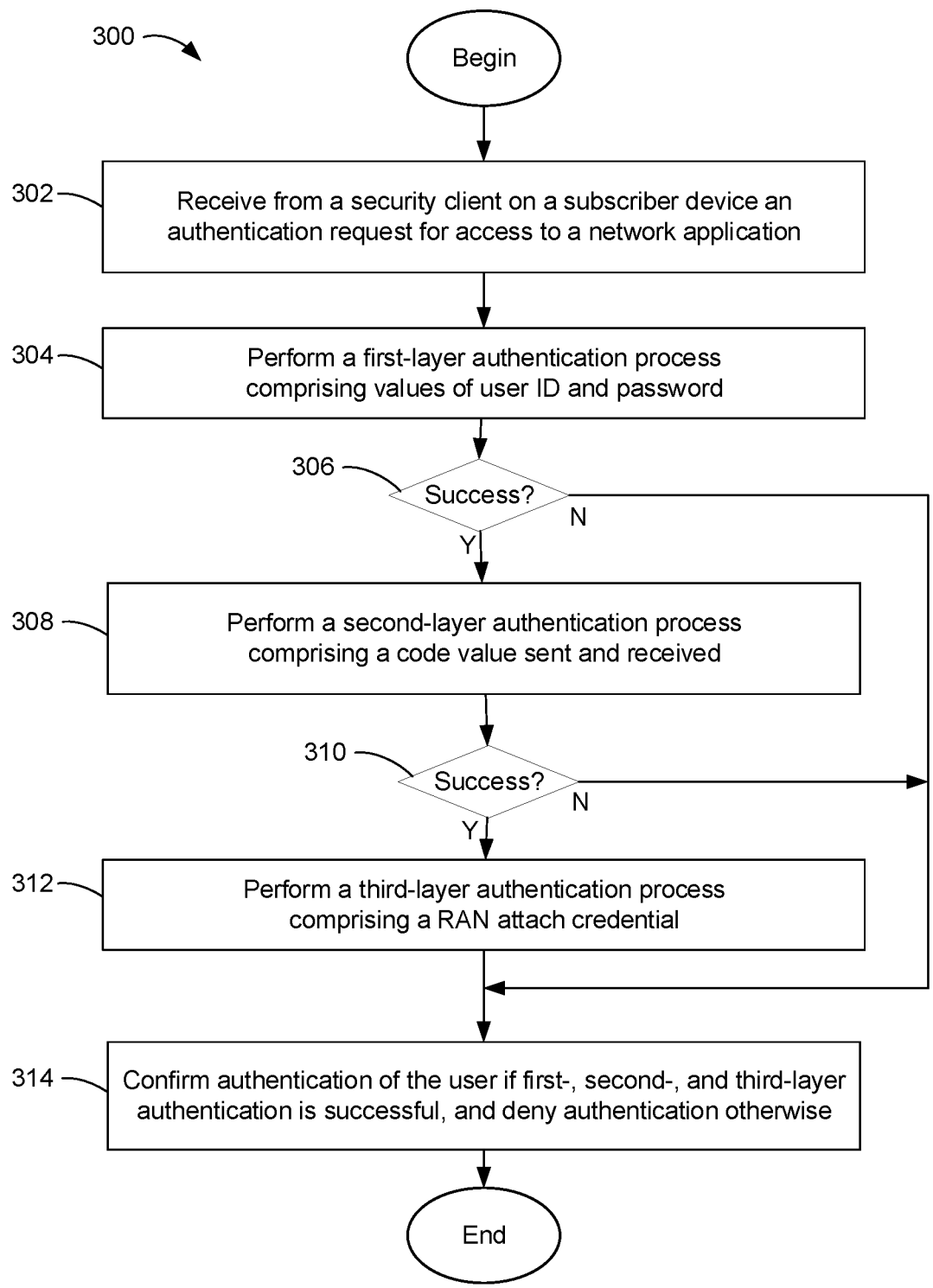
FIG. 3 is a flow chart of a method according to an embodiment of the disclosure.

FIG. 3 is a flow chart of a method 300 according to an embodiment of the disclosure. In an embodiment, the method 300 is a method of authenticating a user by a security server app 134 that is executing on a network server 106 operated by a wireless communication service provider. At step 302, the security service executing on the network server 106 receives a multi-level authentication request from a security client app 130 that is executing on the UE 102. The multi-level authentication request is for access to a network application, which may be executing, for example, on the application server 108.

At step 304, the security server app 134 performs a first-layer authentication process, which includes determining whether response values of user ID and password received from the security client app 130 match stored values of user ID and password stored by the network application and associated with a network subscriber identifier that is associated with the user. In some embodiments, the security service may send the security client app 130 a first-layer multi-level authentication request and, in response, receive from the security client app 130 a first-layer authentication response that includes the response values of user ID and password. At step 306, if it is determined that the response values of user ID and password do not match stored values of user ID and password, the method 300 goes to step 314 where, as will be explained in more detail below, the user is denied authentication by the security service.

At step 308, the security server app 134 performs a second-layer authentication process, which includes determining whether a response code value received from the security client app 130 matches a generated code value sent by the security service to the security client app 130. In various embodiments, the security server app 134 may send the generated code value to the UE 102 by a network message service (e.g., SMS) or via email to an email address that is associated with the network subscriber identifier. The security server app 134 may then send the security client app 130 a second-layer multi-level authentication request and, in response, receive from the security client app 130 a second-layer authentication response that includes the response code value. At step 310, if it is determined that the response code value does not match the generated code value, the method 300 goes to step 314 where the user is denied authentication by the security service.

At step 312, the security server app 134 performs a third-layer authentication process, which includes determining whether a response RAN attach credential received from the security client app 130 matches a stored RAN attach credential that is associated with the network subscriber identifier and stored by the wireless communication service provider. In some embodiments, the security server app 134 may send the security client app 130 a third-layer multi-level authentication request and, in response, receive from the security client app 130 a third-layer authentication response comprising the response RAN attach credential stored in the subscriber device.

At step 314, the security server app 134 sends the security client app 130 an authentication response that confirms authentication of the user based on successful first-layer, second-layer, and third-layer authentication of the user, and denies authentication of the user otherwise.

In some embodiments, if it is determined that the response RAN attach credential matches the stored RAN attach credential, the method 300 may further include the security server app 134 sending the security client app 130 a biometric multi-level authentication request and, in response, receiving a biometric authentication response that includes a user identification of the user of the UE 102, where the biometric authentication response is determined by a biometric authentication process executing on the UE 102. In such embodiments, at step 314 the authentication response confirms authentication of the user if, in addition to successful first-layer, second-layer, and third-layer authentication of the user, the user identification matches the network subscriber identifier, and denies authentication of the user otherwise.

In some embodiments, where authentication of the user has been confirmed by performance of the method 300, the authentication response sent by the security server app 134 includes a multi-level authentication token generated by the security server app 134. The security server app 134 further associates the multi-level authentication token with the RAN attach credential and the network subscriber identifier and stores the multi-level authentication token for future use.

The security server app 134 may subsequently receive a second multi-level authentication request from the security client app 130, where the second multi-level authentication request includes the RAN attach credential and a received multi-level authentication token and requests access to the same network application. The security server app 134 determines whether the received multi-level authentication token matches the generated multi-level authentication token that is associated with the RAN attach credential and the network subscriber identifier. The security server app 134 then sends to the security client app 130 a second authentication response that confirms authentication of the user based on the received multi-level authentication token matching the generated multi-level authentication token, and denies authentication of the user otherwise.

In some such embodiments, the multi-level authentication token includes a time-stamp reflecting the time and/or date of its creation. When the security server app 134 receives the second multi-level authentication request from the network application, the security server app 134 may compare the time-stamp of either the stored multi-level authentication token or the received multi-level authentication token to a current time to determine whether the multi-level authentication token has exceeded a predetermined 'age' and the token authentication process will no longer be accepted in place of the authentication processes of the method 300. In such situations, the security server app 134 re-performs the authentication processes of the method 300.

Figure 4:
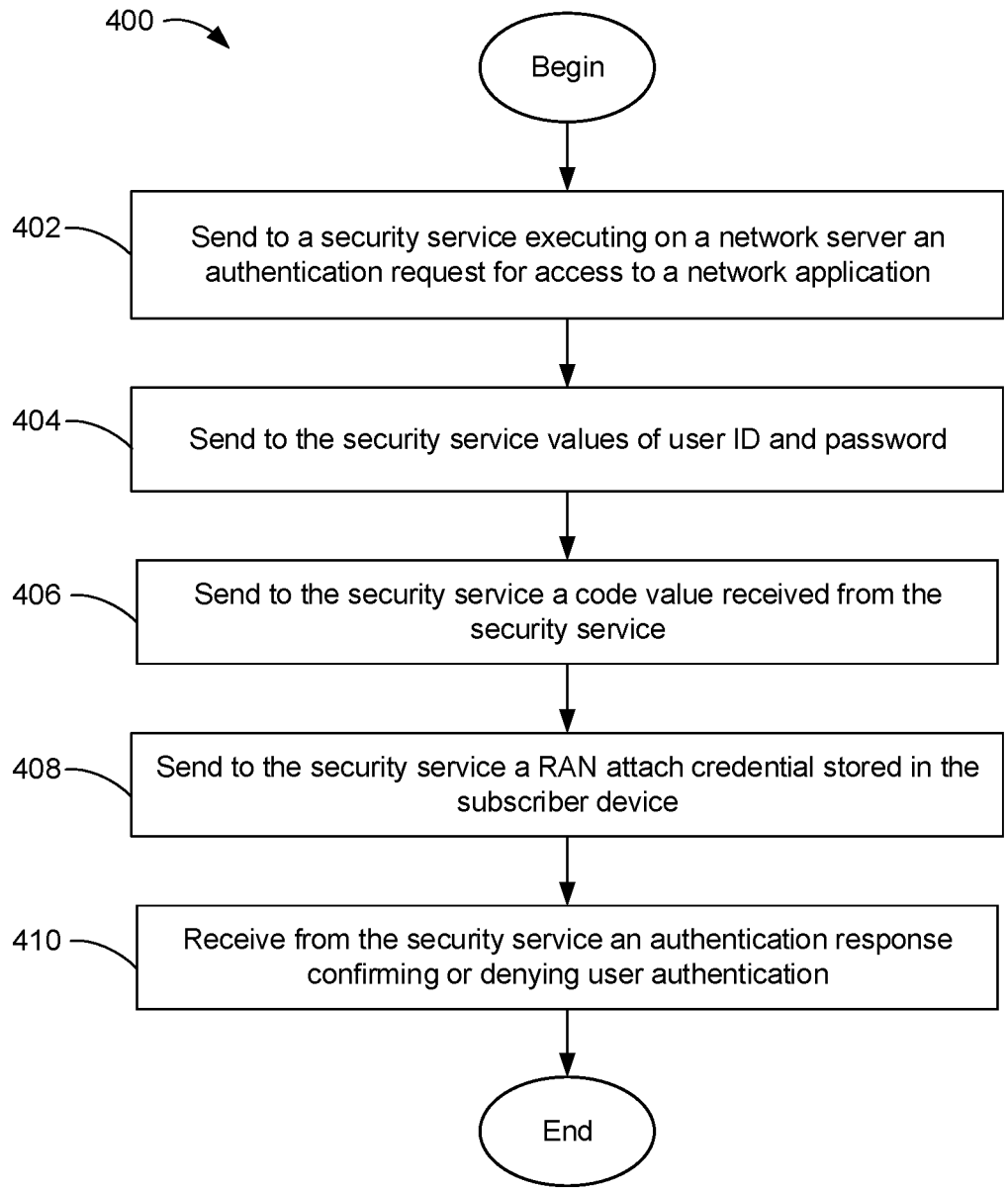
FIG. 4 is a flow chart of a method according to an embodiment of the disclosure.

FIG. 4 is a flow chart of a method 400 according to an embodiment of the disclosure. In an embodiment, the method 400 is a method for authenticating a user by a security client app 130 executing on the UE 102. At step 402, the security client app 130 sends a multi-level authentication request for access to a network application to a security server app 134 executing on a network server 106 operated by a wireless communication service provider.

At step 404, the security client app 130 sends values of user identifier (ID) and password to the security server app 134. In some embodiments, the security client app 130 receives a first-layer multi-level authentication request from the security server app 134 and, in response, sends a first-layer authentication response to the security server app 134 that includes the values of user ID and password.

At step 406, the security client app 130 sends to the security server app 134 a code value that was received from the security server app 134. In some embodiments, the user enters the received code value into the security client app 130 via a user interface. In various embodiments, the security client app 130 may receive the code value from the security server app 134 via a network message service (e.g., SMS) or via email to an email address that is associated with the user. The security client app 130 may receive a second-layer multi-level authentication request from the security server app 134 and, in response, send the security server app 134 a second-layer authentication response that includes the code value received from the security server app 134.

At step 408, the security client app 130 sends the security server app 134 a RAN attach credential that is stored in the UE 102. In some embodiments, the security client app 130 receives a third-layer multi-level authentication request from the security server app 134 and, in response, sends the security server app 134 a third-layer authentication response that includes the RAN attach credential. At step 410, the security client app 130 receives from the security server app 134 an authentication response that confirms or denies authentication of the user.

In some embodiments, where the authentication response received from the security server app 134 confirms authentication of the user, the authentication response may further include a multi-level authentication token. In such embodiments, the security client app 130 may send the security server app 134 a second multi-level authentication request that includes the RAN attach credential and the multi-level authentication token and requests access to the network application and, in response, receive from the security server app 134 a second authentication response that confirms or denies authentication of the user.

Figure 5:
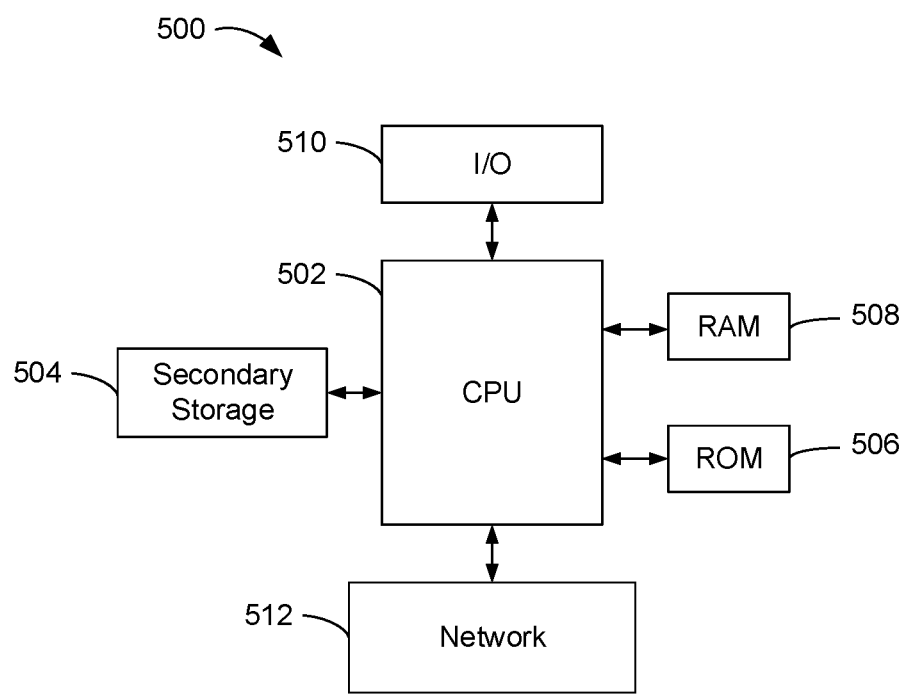
FIG. 5 illustrates a computer system suitable for implementing one or more embodiments disclosed herein.

FIG. 5 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

V/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, Zigbee, narrowband Internet of things (NB IoT), near field communications (NFC), radio frequency identity (RFID), The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Figure 6:
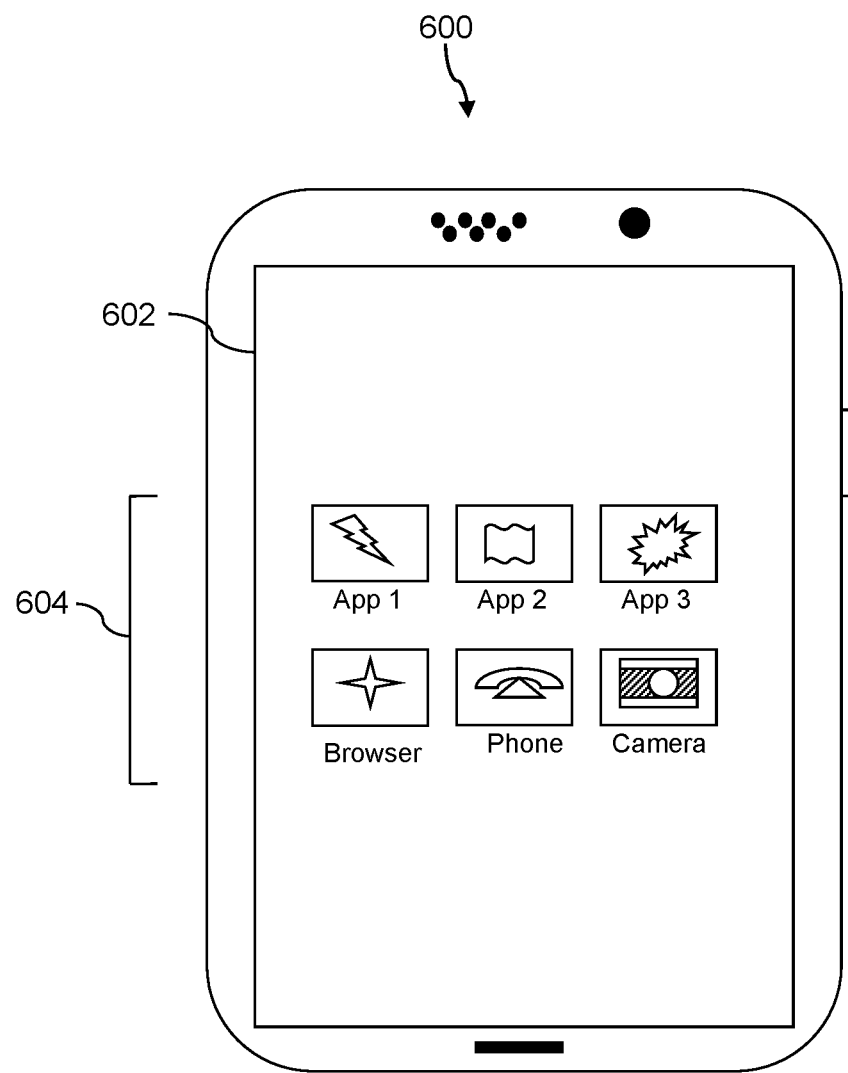
FIG. 6 is an illustration of a wireless communication device according to an embodiment of the disclosure.

FIG. 6 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touchscreen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 7:
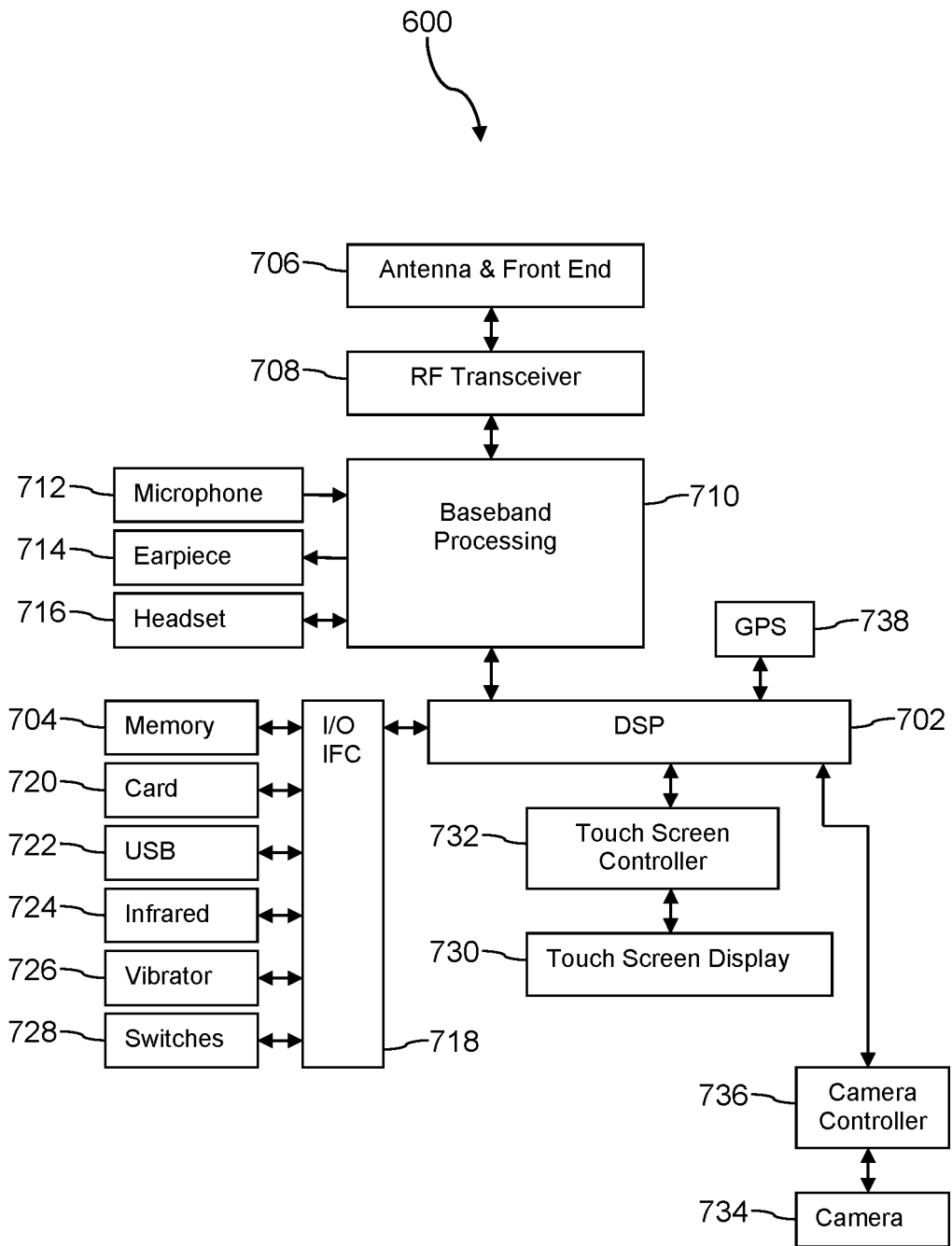
FIG. 7 is a block diagram or a hardware architecture of a wireless communication device according to an embodiment of the disclosure.

FIG. 7 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include one or more antenna and front end unit 706, a one or more radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen display 730, a touch screen controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 708 may comprise a near field communication (NFC) transceiver. The NFC transceiver may be used to complete payment transactions with point-of-sale terminals or other communications exchanges. In an embodiment, each of the different radio transceivers 708 may be coupled to its own separate antenna. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 8A:
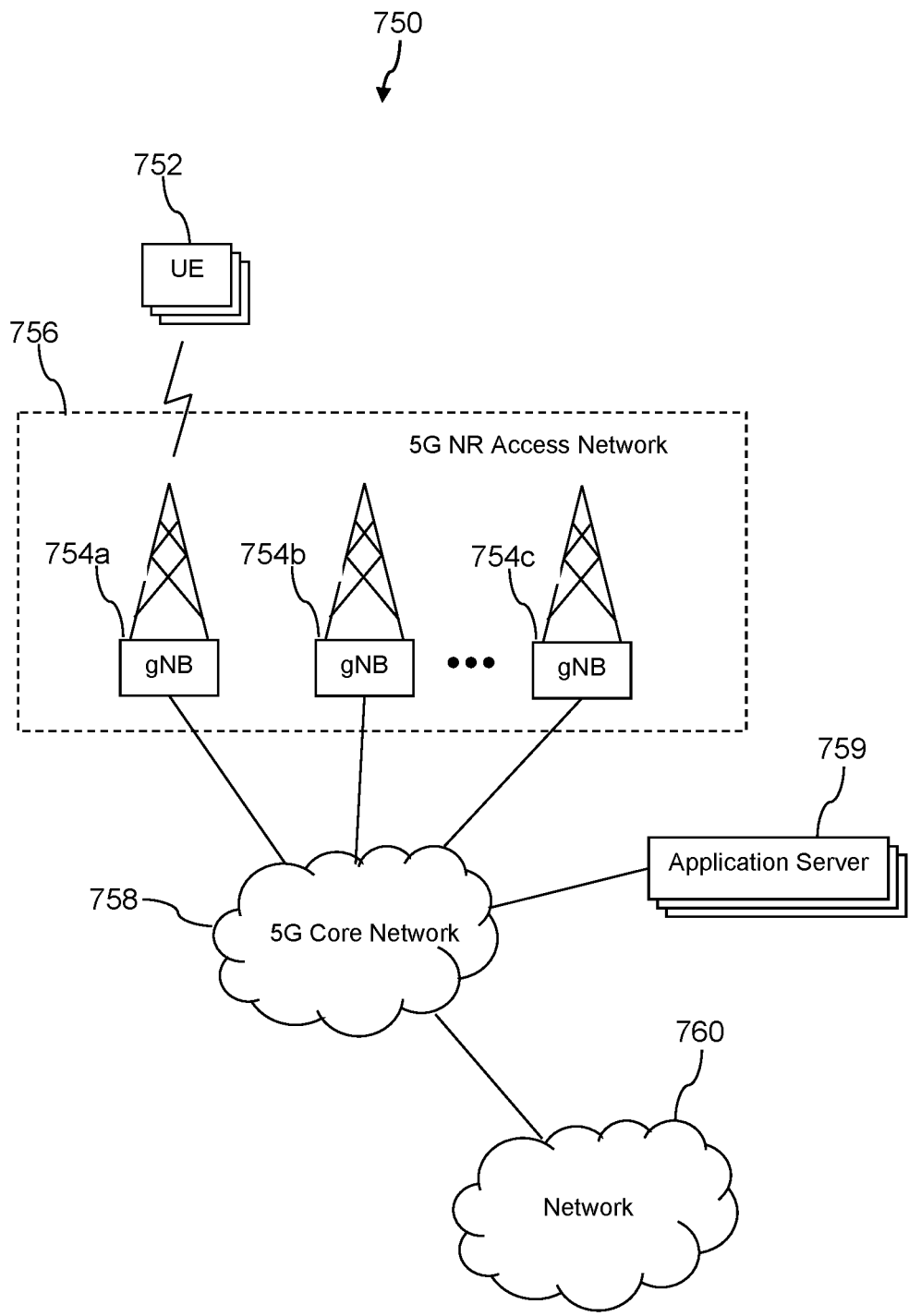
FIG. 8A is a block diagram of another communication system according to an embodiment of the disclosure.

Turning now to FIG. 8A, an exemplary communication system 750 is described. Typically, the communication system 750 includes a number of access nodes 754 that are configured to provide coverage in which UEs 752 such as cell phones, tablet computers, machine-type-communication devices, tracking devices, embedded wireless modules, and/or other wirelessly equipped communication devices (whether or not user operated), can operate. The access nodes 754 may be said to establish an access network 756. The access network 756 may be referred to as a radio access network (RAN) in some contexts. In a 5G technology generation an access node 754 may be referred to as a next Generation Node B (gNB). In 4G technology (e.g., long term evolution (LTE) technology) an access node 754 may be referred to as an evolved Node B (eNB). In 3G technology (e.g., code division multiple access (CDMA) and global system for mobile communication (GSM)) an access node 754 may be referred to as a base transceiver station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations.

In an embodiment, the access network 756 comprises a first access node 754a, a second access node 754b, and a third access node 754c. It is understood that the access network 756 may include any number of access nodes 754. Further, each access node 754 could be coupled with a core network 758 that provides connectivity with various application servers 759 and/or a network 760. In an embodiment, at least some of the application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 could engage in air-interface communication with an access node 754 and could thereby communicate via the access node 754 with various application servers and other entities.

The communication system 750 could operate in accordance with a particular radio access technology (RAT), with communications from an access node 754 to UEs 752 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 754 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 could define an air interface configured in a specific manner to define physical resources for carrying information wirelessly between the access node 754 and UEs 752.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 752.

In addition, certain resource elements on the example air interface could be reserved for special purposes. For instance, on the downlink, certain resource elements could be reserved to carry synchronization signals that UEs 752 could detect as an indication of the presence of coverage and to establish frame timing, other resource elements could be reserved to carry a reference signal that UEs 752 could measure in order to determine coverage strength, and still other resource elements could be reserved to carry other control signaling such as PRB-scheduling directives and acknowledgement messaging from the access node 754 to served UEs 752. And on the uplink, certain resource elements could be reserved to carry random access signaling from UEs 752 to the access node 754, and other resource elements could be reserved to carry other control signaling such as PRB-scheduling requests and acknowledgement signaling from UEs 752 to the access node 754.

The access node 754, in some instances, may be split functionally into a radio unit (RU), a distributed unit (DU), and a central unit (CU) where each of the RU, DU, and CU have distinctive roles to play in the access network 756. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 8B:
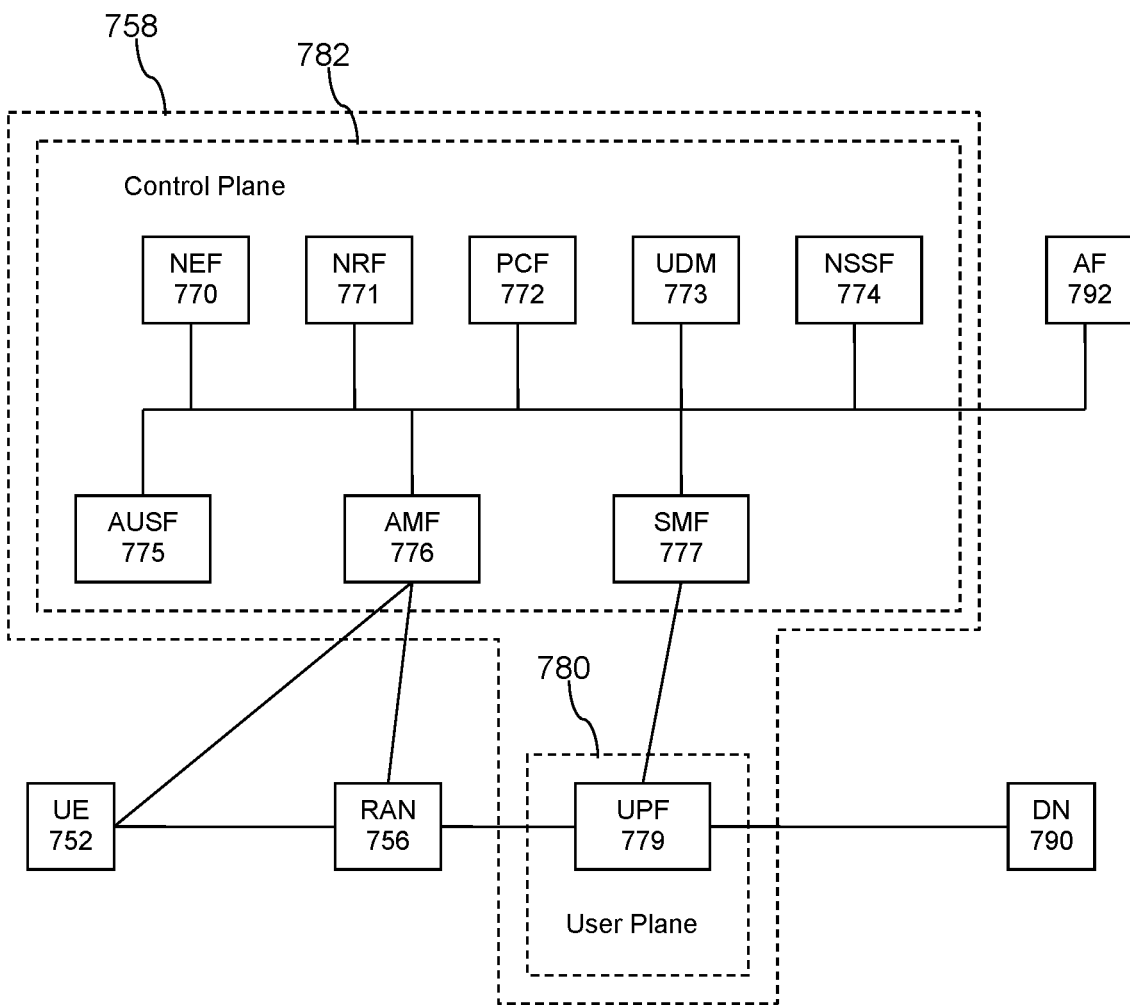
FIG. 8B is a block diagram of a core network of the communication system of FIG. 8A according to an embodiment of the disclosure.

Turning now to FIG. 8B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment.

The UPF 779 delivers packet processing and links the UE 752, via the access network 756, to a data network 790 (e.g., the network 560 illustrated in FIG. 8A). The AMF 776 handles registration and connection management of non-access stratum (NAS) signaling with the UE 752. Said in other words, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 779. The SMF 777 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be execute on an application server 779 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

Figure 9A:
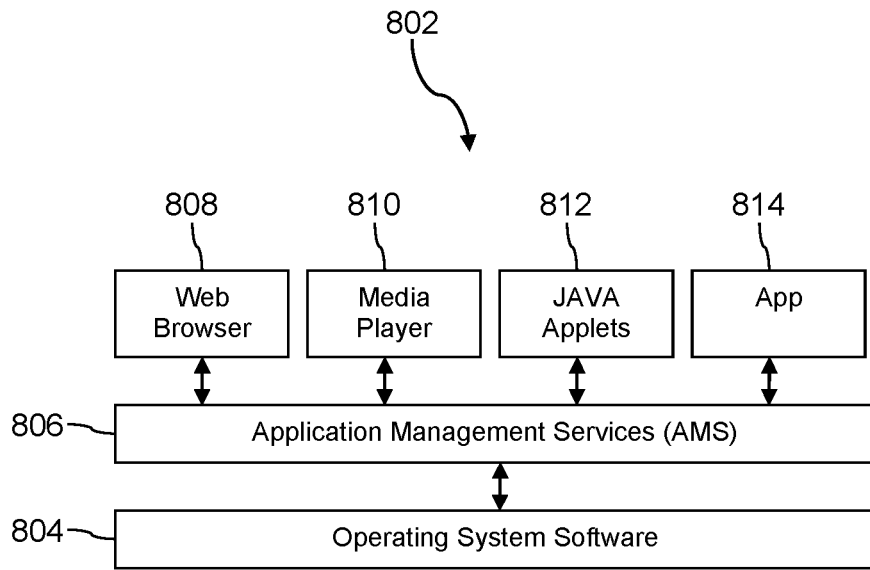
FIG. 9A is a block diagram of a software architecture of a wireless communication device according to an embodiment of the disclosure.

FIG. 9A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 400. Also shown in FIG. 9A are a web browser application 808, a media player application 810, and JAVA applets 812. The web browser application 808 may be executed by the UE 400 to browse content and/or the Internet, for example when the UE 400 is coupled to a network via a wireless link. The web browser application 808 may permit a user to enter information into forms and select links to retrieve and view web pages. The media player application 810 may be executed by the UE 400 to play audio or audiovisual media. The JAVA applets 812 may be executed by the UE 400 to provide a variety of functionality including games, utilities, and other functionality.

Figure 9B:
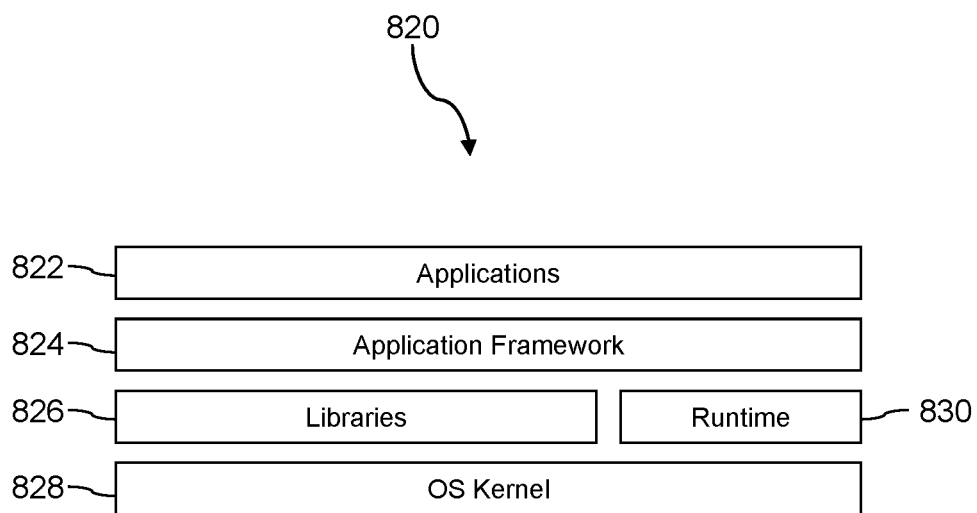
FIG. 9B is a block diagram of another software architecture of a wireless communication device according to an embodiment of the disclosure.

FIG. 9B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for authenticating a user by a security service executing on a network server operated by a wireless communication service provider, the method comprising:
receiving by the security service executing on the network server from a security client executing on a subscriber device a multi-level authentication request for access to a network application;
performing by the security service a first-layer authentication process, comprising determining whether response values of user identifier (ID) and password received from the security client match stored values of user ID and password stored by the network application and associated with a network subscriber identifier associated with the user;
based on successful first-layer authentication of the user, performing by the security service a second-layer authentication process, comprising determining whether a response code value received from the security client matches a generated code value sent by the security service to the security client;
based on successful second-layer authentication of the user, performing by the security service a third-layer authentication process, comprising determining whether a radio access network (RAN) attach credential received from the security client matches a RAN attach credential stored by the wireless communication service provider and associated with the network subscriber identifier, the RAN attach credential created based
on an exchange of confidential information between the subscriber device and the wireless communication service provider during authentication of the subscriber device into the RAN, wherein the RAN attach credential is a network registration artifact associated with the subscriber device and is created by a secure module of the subscriber device responsive to attachment of the subscriber device to a RAN of the wireless communication service provider; and
sending by the security service to the security client an authentication response that confirms authentication of the user based on successful first-layer, second-layer, and third-layer authentication of the user, and denies authentication of the user otherwise.

2. The method of claim 1, wherein the RAN attach credential is created by a subscriber identification module (SIM) of the subscriber device when an active call or data session of the subscriber device is transferred between cell sites or channels of the wireless communication service provider.

3. The method of claim 1, wherein:
the first-layer authentication process comprises:
sending by the security service to the security client a first-layer multi-level authentication request; and
receiving by the security service from the security client a first-layer authentication response comprising the response values of user ID and password;
the second-layer authentication process comprises:
sending by the security service to the security client the generated code value;
sending by the security service to the security client a second-layer multi-level authentication request; and
receiving by the security service from the security client a second-layer authentication response comprising the response code value;
the third-layer authentication process comprises:
sending by the security service to the security client a third-layer multi-level authentication request; and
receiving by the security service from the security client a third-layer authentication response comprising a response RAN attach credential stored in the subscriber device.

4. The method of claim 1, wherein the generated code value is sent to the subscriber device via a network message service.

5. The method of claim 1, further comprising:
based on determining that the RAN attach credential received from the security client matches the RAN attach credential stored by the wireless communication service provider:
sending by the security service to the security client a biometric multi-level authentication request; and
receiving by the security service from the security client a biometric authentication response comprising a user identification of the user of the security client, the biometric authentication response determined by a biometric authentication process,
wherein the authentication response confirms authentication of the user further based on a result of determining whether the user identification matches the network subscriber identifier.

6. The method of claim 1, wherein:
the multi-level authentication request is a first multi-level authentication request, and
the authentication response is a first authentication response and comprises a generated multi-level authentication token generated by the security service and associated with the RAN attach credential and the network subscriber identifier,
the method further comprising:
receiving by the security service a second multi-level authentication request from the security client, the second multi-level authentication request comprising the RAN attach credential and a received multi-level authentication token and requesting access to the network application;
determining by the security service whether the received multi-level authentication token matches the generated multi-level authentication token associated with the RAN attach credential and the network subscriber identifier; and
sending by the security service to the security client a second authentication response that confirms authentication of the user based on the received multi-level authentication token matching the generated multi-level authentication token, and denies authentication of the user otherwise.

7. The method of claim 6, wherein the received multi-level authentication token comprises a time-stamp, the method further comprising:
    comparing by the security service the time-stamp of the received multi-level authentication token to a current time,
    wherein the second authentication response confirms authentication of the user further based on a result of comparing the time-stamp of the received multi-level authentication token to the current time.

8. A method for authenticating a user by a security client executing on a subscriber device, the method comprising:
    sending by the security client executing on the subscriber device to a security service executing on a network server operated by a wireless communication service provider a multi-level authentication request for access to a network application;
    sending by the security client to the security service values of user identifier (ID) and password to cause the security service to determine whether the user ID and password sent by the security client match stored values of user ID and password stored by the network application and associated with a network subscriber identifier associated with the user;
    subsequent to sending the user ID and password, sending by the security client to the security service a code value received from the security service to cause the security service to determine whether the code value sent by the security client matches a generated code value sent by the security service to the security client;
    subsequent to sending the code value, sending by the security client to the security service a radio access network (RAN) attach credential stored in the subscriber device, wherein the RAN attach credential is a network registration artifact associated with the subscriber device and is created by a secure module of the subscriber device responsive to attachment of the subscriber device to a RAN of the wireless communication service provider, the sending to cause the security service to determine whether the RAN attach credential sent by the security client matches a RAN attach credential stored by the wireless communication service provider and associated with the network subscriber identifier, the RAN attach credential created based on an exchange of confidential information between the subscriber device and the wireless communication service provider during authentication of the subscriber device into the RAN; and
    receiving by the security client from the security service an authentication response confirming or denying authentication of the user.

9. The method of claim 8, further comprising:
    receiving by the security client from the security service a first-layer multi-level authentication request and, in response, sending by the security client to the security service a first-layer authentication response comprising the values of user ID and password;
    receiving by the security client from the security service a second-layer multi-level authentication request and, in response, sending by the security client to the security service a second-layer authentication response comprising the code value received from the security service; and
    receiving by the security client from the security service a third-layer multi-level authentication request and, in response, sending by the security client to the security service a third-layer authentication response comprising the RAN attach credential.

10. The method of claim 8, wherein the RAN attach credential is created by a subscriber identification module (SIM) of the subscriber device when an active call or data session of the subscriber device is transferred between cell sites or channels of the wireless communication service provider.

11. The method of claim 8, wherein the code value is received via a network message service.

12. The method of claim 8, further comprising:
    receiving by the security client from the security service a biometric multi-level authentication request and, in response, sending by the security client to the security service a biometric authentication response comprising a user identification of the user of the security client, the biometric authentication response determined by a biometric authentication process executed on the subscriber device.

13. The method of claim 8, wherein:
    the multi-level authentication request is a first multi-level authentication request, and
    the authentication response is a first authentication response and comprises a multi-level authentication token,
    the method further comprising:
        sending by the security client to the security service a second multi-level authentication request, comprising the RAN attach credential and the multi-level authentication token and requesting access to the network application; and
        receiving by the security client from the security service a second authentication response confirming or denying authentication of the user.

14. A method for authenticating a user by a security service executing on a network server of a wireless communication service provider, the method comprising:
    receiving by the security service executing on the network server a multi-level authentication request from a network application, the multi-level authentication request comprising an authentication layers specification specifying layers of authentication for the security service to perform, a network subscriber identifier, and an identifier of a subscriber device;
    performing by the security service a first-layer authentication process, comprising determining whether response values of user identifier (ID) and password received from a security client of the subscriber device match stored values of user ID and password stored by the network application and associated with the network subscriber identifier;
    responsive to performing the first-layer authentication process, performing by the security service a second-layer authentication process, comprising determining whether a response code value received from the security client matches a generated code value sent by the security service to the security client;
    responsive to performing the second-layer authentication process, performing by the security service a third-layer authentication process, comprising determining whether a radio access network (RAN) attach credential received from the security client matches a RAN attach credential stored by the wireless communication service provider and associated with the network subscriber identifier, wherein the RAN attach credential is a network registration artifact associated with the subscriber device and is created by a secure module of the subscriber device responsive to attachment of the subscriber device to a RAN of the wireless communication service provider;

responsive to performing the third-layer authentication process and if specified by the authentication layers specification, performing by the security service a fourth-layer authentication process, comprising determining whether an identity of a user of the security client determined by a biometric authentication process matches the network subscriber identifier; and sending by the security service to the network application an authentication response that confirms or denies authentication of the user based on results of the layers of authentication specified by the authentication layers specification and performed by the security service.

15. The method of claim 14, wherein the authentication layers specification specifies the third-layer authentication process.

16. The method of claim 14, wherein the RAN attach credential is created by a subscriber identification module (SIM) of the subscriber device when an active call or data session of the subscriber device is transferred between cell sites or channels of the wireless communication service provider.

17. The method of claim 14, wherein:
the first-layer authentication process comprises:
    sending by the security service to the security client a first-layer multi-level authentication request; and
    receiving by the security service from the security client a first-layer authentication response comprising the response values of user ID and password;
the second-layer authentication process comprises:
    sending by the security service to the security client the generated code value;
    sending by the security service to the security client a second-layer multi-level authentication request; and
    receiving by the security service from the security client a second-layer authentication response comprising the response code value;
the third-layer authentication process comprises:
    sending by the security service to the security client a third-layer multi-level authentication request; and
    receiving by the security service from the security client a third-layer authentication response comprising the RAN attach credential stored in the subscriber device;
the fourth-layer authentication process comprises:
    sending by the security service to the security client a biometric multi-level authentication request; and
    receiving by the security service from the security client a biometric authentication response identifying the user of the security client.

18. The method of claim 14, wherein the multi-level authentication request is a first multi-level authentication request and the authentication response is a first authentication response, the method further comprising:
sending by the security service to the security client a second authentication response comprising a generated multi-level authentication token generated by the security service and associated with the RAN attach credential and the network subscriber identifier;
receiving by the security service a second multi-level authentication request from the network application, the second multi-level authentication request comprising the RAN attach credential and the network subscriber identifier;
performing by the security service a token authentication process, the token authentication process comprising:
    sending by the security service to the security client a token authentication request;
    receiving by the security service a token authentication response from the security client, the token authentication response comprising a received multi-level authentication token and a received RAN attach credential;
    determining by the security service whether the received multi-level authentication token matches the generated multi-level authentication token and the received RAN attach credential matches the RAN attach credential; and
    sending by the security service to the network application a third authentication response that confirms or denies authentication of the user based on a result of determining whether the received multi-level authentication token matches the generated multi-level authentication token and the received RAN attach credential matches the RAN attach credential.

19. The method of claim 18, wherein the received multi-level authentication token comprises a time-stamp, the method further comprising:
comparing by the security service the time-stamp of the received multi-level authentication token to a current time,
wherein the third authentication response confirms or denies authentication of the user further based on a result of comparing the time-stamp of the received multi-level authentication token to the current time.

20. The method of claim 18, wherein:
the authentication layers specification is a first authentication layers specification,
the second multi-level authentication request comprises a second authentication layers specification, and
the token authentication process is performed only if the second authentication layers specification matches the first authentication layers specification.

* * * * *